(12) United States Patent
Wong

(10) Patent No.: US 7,979,698 B2
(45) Date of Patent: Jul. 12, 2011

(54) APPARATUS AND METHOD FOR PROVING AUTHENTICITY WITH PERSONAL CHARACTERISTICS

(75) Inventor: Joseph D. Wong, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2059 days.

(21) Appl. No.: 10/368,692

(22) Filed: Feb. 19, 2003

(65) Prior Publication Data

US 2004/0162981 A1 Aug. 19, 2004

(51) Int. Cl.
*H04L 9/00* (2006.01)
(52) U.S. Cl. ........ 713/161; 713/170; 713/176; 380/201; 380/202; 380/229; 726/2; 704/226
(58) Field of Classification Search .................. 713/1, 2, 713/188, 194, 161, 170, 176; 380/200, 201, 380/255, 277, 229, 232; 726/2; 704/226
See application file for complete search history.

(56) References Cited

U.S. PATENT DOCUMENTS

| | | | |
|---|---|---|---|
| 5,499,294 A | | 3/1996 | Friedman |
| 5,805,674 A | * | 9/1998 | Anderson, Jr. ............. 379/93.03 |
| 5,995,630 A | | 11/1999 | Borza |
| 6,055,314 A | * | 4/2000 | Spies et al. .................... 380/228 |
| 6,134,660 A | * | 10/2000 | Boneh et al. ................... 713/193 |
| 6,367,013 B1 | | 4/2002 | Bisbee et al. |
| 6,401,206 B1 | | 6/2002 | Khan et al. |
| 6,433,818 B1 | | 8/2002 | Steinberg et al. |
| 6,535,622 B1 | * | 3/2003 | Russo et al. ................... 382/124 |
| 6,560,581 B1 | * | 5/2003 | Fox et al. ......................... 705/51 |
| 6,615,171 B1 | * | 9/2003 | Kanevsky et al. ............ 704/246 |
| 6,754,349 B1 | * | 6/2004 | Arthan ........................... 380/286 |
| 6,757,361 B2 | * | 6/2004 | Blair et al. .................... 379/67.1 |
| 6,879,968 B1 | * | 4/2005 | Hayakawa et al. ............. 706/20 |
| 6,990,444 B2 | * | 1/2006 | Hind et al. ..................... 704/235 |
| 7,039,805 B1 | * | 5/2006 | Messing ........................ 713/170 |
| 7,466,826 B2 | * | 12/2008 | Andreaux et al. ............. 380/277 |
| 2002/0140542 A1 | * | 10/2002 | Prokoski et al. ............. 340/5.52 |
| 2003/0105964 A1 | * | 6/2003 | Brainard et al. .............. 713/178 |
| 2009/0259858 A1 | * | 10/2009 | Walker et al. ................. 713/194 |

* cited by examiner

Primary Examiner — Aravind K Moorthy
Assistant Examiner — Joseph Pan (57) ABSTRACT

The present invention encrypts authentication information into an image, document or recording. Briefly described, in architecture, one embodiment is a method comprising generating the original work; generating authentication data when the original work is generated, the authentication data comprising at least location information identifying the location where the original work is generated, the location information provided by a received signal from a remote device, date and time information identifying when the original work is generated, the date and time information provided by a received signal from a remote device, and biometric information identifying an originator of the original work; and encrypting the original work with the authentication data using a secret private key when original work is generated.

22 Claims, 5 Drawing Sheets

APPARATUS AND METHOD FOR PROVING AUTHENTICITY WITH PERSONAL CHARACTERISTICS

TECHNICAL FIELD

The present invention is generally related to encryption, more particularly, is related to a system and method for encrypting authentication information into an image, document or recording.

BACKGROUND

Encryption techniques may be employed to provide security for, to prove authenticity of, and/or secure other relevant information pertinent to an image, document or recording. A variety of information may be encrypted into the image, document or recording. An image, document or recording having such information, protected from tampering by secure encryption, is very desirable in proving issues of copyright, ownership and authenticity.

One example of encrypting biometric information is disclosed in U.S. Pat. No. 6,401,206 to Khan et al. The Khan digital identity may include biometric information such as a voice, fingerprint or retinal scans. The Khan digital identity is generated only once in its life cycle and it can be easily maintained by the owner. The Khan digital identity may be used to authenticate the owner. The owner may sign as many documents as desired. However, one embodiment involves the owner/signer placing a copy of the digital identity in escrow or with a third party for safekeeping. Also, because the Khan digital identity is created before it is used, the Khan digital identity may be fraudulently obtained and/or used without permission by an unscrupulous third party. Furthermore, real-time information cannot be included in the Khan digital identity.

Another example, disclosed in U.S. Pat. No. 5,995,630 to Borza, encodes biometric information into an image frame. The biometric information is also stored in a memory. When the biometric information retrieved from the image is compared to the saved real-time biometric information of an individual, and the biometric information matches, an encryption and decryption key associated with the matching data is provided to an encrypting and decrypting system for encrypting files for storage and for decrypting flies for access. When no match is provided, no key is provided and the system functions absent encryption or decryption. Accordingly, the Borza device is configured prior to initial use. Thus, biometric information is limited to providing access to encryption and decryption keys. Thus, a third party cannot access the encrypted information to determine information of interest relating to the image, document or recording, since a match of biometric data is impossible.

Other types of information may be encrypted into an image to enhance proof of authenticity of the image. One such device, disclosed in U.S. Pat. No. 5,499,294 to Friedman, encodes location, date, time, light level, color, temperature, f/stop, shutter speed, latitude and longitude of the camera position, camera direction, focusing distance of the camera lens system, the camera pointing direction, and other attributes of interest into an image. However, and more particularly, Friedman teaches that the accuracy of the time and date information is subject to corruption and/or error because the date and time information is specified to the clock at the time of manufacture.

SUMMARY

The present invention encrypts authentication information into an image, document or recording. Briefly described, one embodiment is a method comprising generating the original work; generating authentication data when the original work is generated, the authentication data comprising at least location information identifying a location where the original work is generated, the location information provided by a received signal from a remote device, date and time information identifying when the original work is generated, the date and time information provided by the received signal from the remote device, and biometric information identifying an originator of the original work; and encrypting the original work with the authentication data using a secret private key when the original work is generated.

Another embodiment comprises a device configured to generate the original work, a signal receiver configured to receive location information corresponding to where the original work originated and time information corresponding to when the original work originated, a biometric sensor configured to detect biometric attributes of an originator of the original work and further configured to generate biometric information corresponding to the detected biometric attributes, and a processor configured to generate authentication data that includes at least the location information, the time information and the biometric information, and further configured to encrypt the authenticity data into the original work.

BRIEF DESCRIPTION OF THE DRAWINGS

The components in the drawings are not necessarily to scale relative to each other. Like reference numerals designate corresponding parts throughout the several views.

DETAILED DESCRIPTION

The present invention provides a system and method for encrypting authentication information into an image, document or recording. More specifically, in one embodiment, personal characteristics (biometric information) of the originator, real-time date and time information, and location information is encrypted into an original work such that the authenticity of the original work can be verified to a high degree of certainty at a later time. For convenience, an image, document, audio recording or other creative work is referred to herein as an original work. When an original work is encrypted with the authentication data according to the present invention as described herein, the encrypted authentication data is particularly useful in resolving disputes relating to the origin of the original work. Such disputes may, for example, relate to trademark and/or copyright issues.

Figure 1:
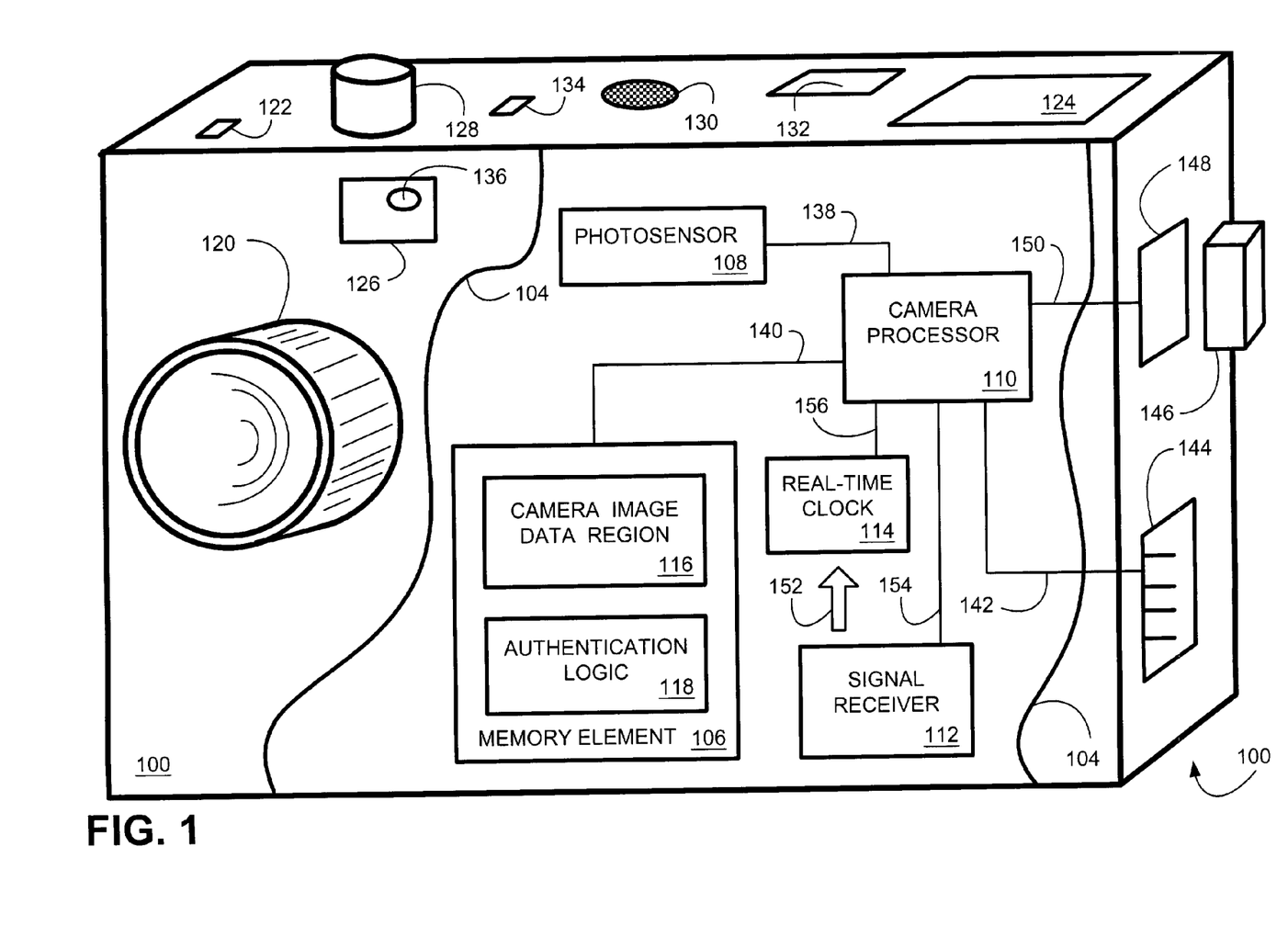
FIG. 1 is a diagram illustrating an embodiment of the authentication information encryption system implemented in an image capture device according to the present invention.

FIG. 1 is a diagram illustrating an embodiment of the authentication information encryption system 100 implemented in an image capture device 102 according to the present invention. Accordingly, when the authentication data, described in greater detail herein, is securely encrypted into the image in a tamper-proof manner, the originator (photographer) of the captured image, the location of the making of the captured image, the time/date of the making of the captured image, and/or other information of interest can be authenticated at a later time. Furthermore, an alternative embodiment employs a public key such that a third party can later access and read the authentication information.

For convenience, the embodiment of the authentication information encryption system 100 is described as being implemented in, or being a part of, a digital camera 102. The present invention is equally applicable in any electronic device configured to generate original works, such as, but not limited to, still images, captured images, video images, documents, books, audio recordings, or other creative works. For example, but not limited to, an alternative embodiment incorporates authentication data into an audio recording, such as a tape or compact disc (CD), in accordance with the present invention, such that the originator of the audio recording, the location of the making of the audio recording, and the time/date of the making of the audio recording can be authenticated.

FIG. 1 illustrates selected components of a digital camera 102 according to the present invention. FIG. 1 includes selected external and internal components of the digital camera 102, demarked by cut-away lines 104. The internal components include at least memory element 106, photosensor 108, camera processor 110, signal receiver 112 and real-time clock 114. In one embodiment, memory element 106 further includes a camera image data region 116 configured to store captured image and the authentication logic 118 of the present invention.

External components of digital camera 102 include lens unit 120, power switch 122, display 124, viewing lens 126, image capture actuation button 128, microphone 130, fingerprint detector 132 and encoding actuator 134. In one embodiment, viewing lens 126 includes a retinal detector 136. In other embodiments, retinal detector 136 is a separate component. In yet another embodiment, the photosensor 108 is configured to detect the retina and/or the fingerprint of the originator.

Retinal detector 136 is configured such that when the user of digital camera 102 captures an image while looking through the viewing lens 126, the retinal detector 136 scans the user's eye and captures or otherwise determines the unique retinal characteristics of the user of the digital camera 102 at the time of image capture. Similarly, at the time of image capture, the fingerprint detector 132 is configured to scan, capture or otherwise determine the unique fingerprint characteristics of the user of the digital camera 102. Also, at the time of image capture, the microphone 130 is configured to capture or otherwise-record any spoken information from the user of the digital camera 102. The determined unique retinal characteristics, fingerprint characteristics and/or voice information is included as part of the authentication data that is securely encrypted into the image with a secret encryption key, as described in greater detail below, provides proof of identity of the originator.

The microphone 130 may also record any other audible background noises. Such recorded audible background noise may be used as further authenticity proof. For example, background noise corresponding to a passing train may provide further authentication proof when an image is allegedly captured at a train station or nearby train tracks. Or, third parties may audibly identify themselves in the background as being present when the image was captured. In audio recording devices employing the present invention, third parties participating in the making of the audio recording may also audibly identify themselves.

When audio information is captured by microphone 130, audio information is captured for a predefined period of time. The time period may be relatively short, so long as sufficient voice information from the originator is captured such that the originator can later be identified by the captured voice information. Other embodiments employ a longer time period, such as when background noises of interest are captured. In all embodiments, the audio information capture time period is proximally related to the generation of the original work. That is, the audio information is captured at the time the original work is created, during the creation of the original work, or during a time period that closely corresponds to the creation of the original work. For example, capturing a still image with digital camera 102 is, relatively, an instantaneous event. The predefined time period must necessarily be greater than the time period of image capture if sufficient meaningful audio information is to be captured. Accordingly, the audio information is captured during a time period that corresponds to the time of capture of the still image.

Prior to capturing an image that is to be securely encrypted with authentication data by embodiments of the present invention, the user of the digital camera 102 may visually preview the image on display 124. Or, the image of the object may be viewed directly through the viewing lens 126. Photosensor 108 is disposed in a suitable location behind lens unit 120 such that an image of object may be focused onto photosensor 108 for capturing. When the user has focused the object and is satisfied with the focused image, the user actuates the image capture actuation button 128 (also referred to as a shutter button or a video record button) to cause digital camera 102 to capture the image of the object. Alternatively, the user could initially provide biometric authentication prior to capturing an image, and then predictively position the digital camera 102 and then automatically trigger the image capture with a suitable timer device or the like. Additionally, after providing biometric authentication, the user may cause a pre-specified change in the image composition for a subject that will appear later. Photosensor 108 detects the image of the object through lens unit 120 and communicates digital image data corresponding to the detected image to the camera processor 110, via connection 138.

In one embodiment, the digital image data corresponding to the captured image is communicated to the memory element 108, via connection 140. In accordance with the present invention, when an image is captured, digital image data corresponding to the image of the object is stored in camera image data region 116. Concurrently, the authentication data determined by embodiments of the present invention is securely encrypted into the captured image. Accordingly, camera image data region 116 is configured to store many images having encrypted authentication data.

In an embodiment employing hard wire connection 142 to communicate captured images to another device, such as personal computer, printer or the like, the captured image data is communicated from the digital camera 102, via connection 140, connection 142 and plug-in interface 144. In another embodiment, digital image data is transferred to a memory module unit 146. When capturing images with digital camera 102, memory module unit 146 is coupled to digital camera 102 through memory unit interface 148. As the user of digital camera 102 actuates the image capture actuation button 128 to cause the camera processor 110 to capture the current image detected by photosensor 108, camera processor 110 communicates the digital image data to the memory module unit 146, via connection 150 and the memory unit interface 148. Accordingly, memory module unit 146 is configured to store many images having encrypted authentication data.

For convenience, digital camera 102 is described above as employing both a memory element 106 and a memory module unit 146 to store captured images having encrypted authentication data. Preferably, digital camera 102 would, in practice, employ either the memory element 106 or the memory module unit 146 to store captured images because employing two different and separate memory systems would be inefficient and costly. (However, it is possible some embodiments of a digital camera 102 could employ both a memory element 106 and a memory module unit 146.)

Signal receiver 112 is configured to receive communication signals having information that corresponds to location information and highly accurate time information. Time information includes the date and time of day. One example of signal receiver 112 is a (GPS) receiver that receives information from GPS satellites. GPS systems are configured to provide highly accurate location information and time information to the signal receiver 112.

Another example of signal receiver 112 is a radio frequency (RF) receiver that receives transmitted location information and time information. The time information includes highly accurate date and time of day information. Yet another example of signal receiver 112 is a mobile cell phone receiver configured to communicate to a location that responds with location information and time information.

The received time/date information is preferably very accurate, and the device communicating the time/date information adjusts the time/date information of real-time clock 114 as necessary to maintain highly accurate time information. Or, the received time/date information is directly incorporated into the authentication data when the original work is created.

Another embodiment comprises a RF transceiver configured to communicate to a plurality of receiving base stations such that the location is determined. For example, the transceiver communicates a signal to at least three receiving base stations. Based upon signal strength of the received signal, or other signal parameters, the location of the device generating the original work can be determined by triangulation or by other suitable computational methods.

The device communicating the location information may provide highly accurate location information, such as in the case of a GPS receiver system. Alternatively, the location information may generally indicate the approximate location where the original work is created. For example, a town, a telephone area code, a mail zip code, an address or other indicia of the location of the transmitting device may be added to the original work to authenticate the original work according to the present invention. Other acceptable forms of location information include altitude, depth or ambient pressure detected by an altimeter, depth gauge or pressure sensor, respectively, incorporated into the device. Furthermore, a plurality of different types of location information may be encrypted into the original work in accordance with the present invention.

In instances where a current location cannot be determined, one embodiment employs the last received location, retrieved from memory element 106, which is used as an approximate current location. The time associated with the retrieved, last-known location may also be used. For example, GPS and/or RF signals cannot be easily communicated from inside some large structures, underground locations, tunnels or underwater. Accordingly, this embodiment is configured to periodically store received location information into memory element 106. If needed, the saved location information can be retrieved and used to provide the location information in accordance with the present invention.

Accurate time information is almost universally available, whereas location information is not. One embodiment acquires a series of accurate time readings and a sparser series of location readings to support extrapolating and/or interpolating of an approximated location within a reduced circular error probability. Time can be accurately obtained from an internal clock and or a plurality of worldwide atomic clock broadcasters [National Institute of Standards and Technology (NIST); radio stations WWVB, WWVH, and WWV], whereas accurate location information typically necessitates the reception of an external signal. When reception from a single range-restricted transmitter of known location (i.e. a cellular phone base station) is not possible, one embodiment employing a location approximation technique appends extrapolation data derived from accurate reliable time measurements and at least one accurate location measurement. When at least two accurate location and time measurements exist, interpolation algorithms can be used to narrow the circular error.

In accordance with embodiments of the authentication information encryption system 100, the user captures an image of an object, also referred to herein as an original work. At the time of capture, biometric data is captured that positively identifies the user as the originator. In an embodiment that employs retinal detector 136, captured retinal information of the user is determined by the present invention and encrypted into the captured image as part of the authentication data. Accordingly, image capture actuation button 128 generates a signal that prompts the retinal detector 136 to scan, capture or otherwise determine the unique retinal characteristics of the user of the digital camera 102 at the time the image is captured. Thus, by retrieving the encrypted retinal information at a later time and comparing the retinal information to the user's retina, proof of the identity of the user as the originator of the original work can be confirmed.

In an embodiment that employs fingerprint detector 132, captured fingerprint information of the user is determined by the present invention and encrypted into the captured image as part of the authentication data. Accordingly, image capture actuation button 128 generates a signal that prompts the fingerprint detector 132 to scan, capture or otherwise determine the unique fingerprint characteristics of the user of the digital camera 102 at the time the image is captured. The audio information is recorded for the predetermined period of time described above. Thus, by retrieving the encrypted fingerprint information at a later time and comparing the fingerprint information to the user's finger, proof of the identity of the user as the originator of the original work can be confirmed.

In an embodiment that employs microphone 130, captured voice information of the user is determined by the present invention and encrypted into the captured image a part of the authentication data. Accordingly, image capture actuation button 128 generates a signal that prompts the microphone 130 to capture or otherwise record any spoken information from the user of the digital camera at the time the image is captured. Thus, by retrieving the encrypted voice information at a later time and comparing the voice information to the user's voice, proof of the identity of the user as the originator of the original work can be confirmed.

Additionally, in an embodiment that employs microphone 130, audible background noises may be recorded by the present invention and encrypted into the captured image a part of the authentication data. Accordingly, image capture actuation button 128 generates a signal that prompts the microphone 130 to capture or otherwise record any audible background noise at the time the image is captured. Thus, the background noise may provide information that further provides proof of the identity of the user and/or attributes of the image.

One embodiment is configured to use as biometric data a captured image of the originator's face and/or other body portions having distinguishing personal characteristics. For example, the originator would capture an image of their face or another distinguishing personal characteristic. This biometric information would then be encrypted into one or more original works in accordance with the present invention.

For convenience, the embodiment of an authentication information encryption system 100 implemented in an image capture device 102 according to the present invention as described in FIG. 1 included microphone 130, fingerprint detector 132 and retinal detector 136 to determine biometric data unique to the user at the time of image capture. An alternative embodiment employs only one of the above-described biometric data capture devices. Another embodiment employs any two of the above-described biometric data capture devices. Thus, one or more forms of biometric data may be used, thereby increasing the reliability of the proof of identity provided by the present invention.

The above-described embodiment of an authentication information encryption system 100 employed a signal receiver 112 to obtain highly accurate time information. An alternative embodiment further includes a highly accurate real-time clock 114. Thus, if a signal cannot be received by the signal receiver 112, the real-time clock 114 is configured to provide proxy (substitute) time information for inclusion as a part of the encrypted authentication data.

Accuracy of the real-time clock is maintained by the signal receiver 112. Signal receiver 112 uses received time information to update the time/date information of the real-time clock 114, as generally denoted by arrow 152. In one embodiment, signal receiver 112 provides time/date information to camera processor 110, via connection 154, such that the camera processor 110 communicates time updates to the real-time clock 114, via connection 156. Alternatively, the real-time clock 114 may be directly coupled to the signal receiver 112 and directly receive time updates. Or, the signal receiver 112 may itself contain a highly accurate clock device that is configured to provide time information when a signal cannot be received.

One embodiment of the authentication information encryption device 100 includes an optional encoding actuator 134. Encoding actuator 134 is configured to enable the authentication logic 118 such that authentication data according to the present invention is securely encrypted into the original work at the time of creation. When in a first state, the authentication information encryption device 100 is disabled such that no authentication information is encrypted at the time of creation. When in a second state, the authentication information encryption device 100 is enabled. Thus, the user determines when the authentication data is to be securely encrypted by actuation of the encoding actuator 134. In an alternative embodiment, encoding actuator 134 is omitted such that the authentication information encryption device 100 is enabled whenever the device is in use.

The above-described encoding actuator 134 may be any suitable actuating device configured to at least allow a user to cause secure encryption of authentication data into an original work according to the present invention. Examples of encoding actuator 134 include, but are not limited to, a pushbutton, a toggle-switch, a multi-position sensing device configured to sense a plurality of switch positions, a touch sensitive device or a light sensitive device. In one embodiment, the encoding actuator 134 is a multifunction controller. Furthermore, the functionality of encoding actuator 134 may be alternatively implemented as a menu displayed on display 124 and configured to cause digital camera 102 to operate in an authentication encryption mode of operation in accordance with the present invention.

Figure 2:
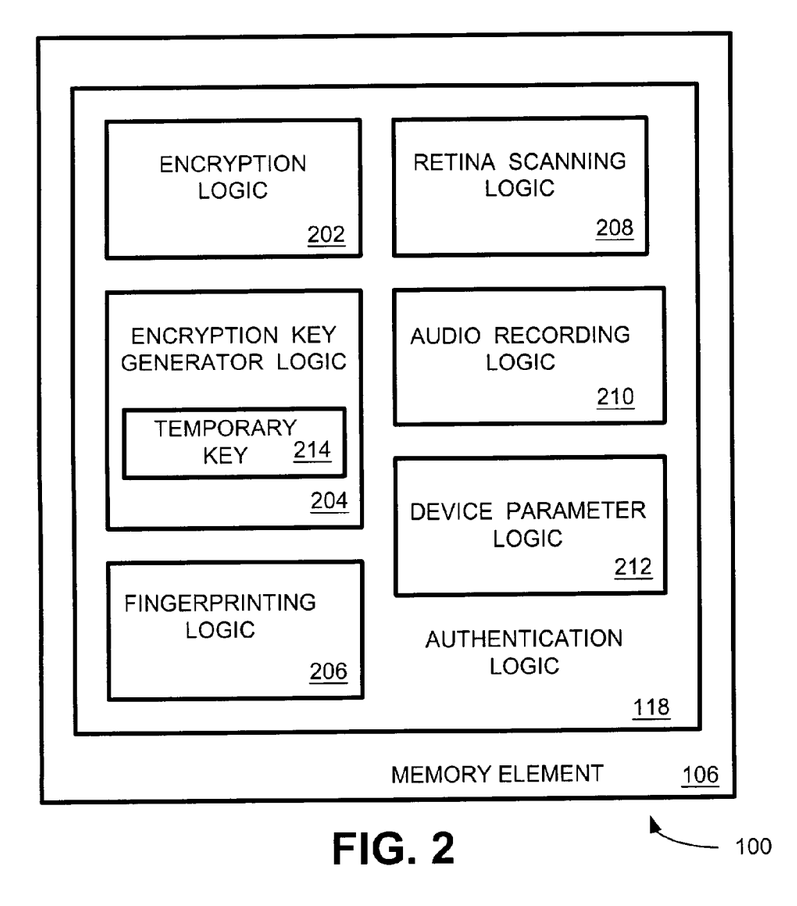
FIG. 2 is a diagram illustrating logic of an embodiment of the authentication information encryption device of the present invention.

FIG. 2 is a diagram illustrating the authentication logic 118 in embodiments of the authentication information encryption device 100. The authentication logic 118, depending upon the embodiment, includes encryption logic 202, encryption key generator logic 204, fingerprinting logic 206, retina scanning logic 208, audio recording logic 210 and device parameter logic 212. The encryption key generator logic 204 includes a region for holding a temporary encryption key 214 that is used for secure encryption of the authentication data into the original work. Other embodiments store the temporary encryption key 214 in another suitable location and/or media.

Encryption logic 202 is configured to securely encrypt authentication data according to the present invention into the original work. Any suitable encryption logic, system or method may be employed by the present invention so long as the authentication data is securely encrypted such that a third party (or the originator) cannot later access and revise the authentication data. That is, the encrypted authentication data, generated at the time of origination, is tamper proof.

The encryption key generation logic 204 is configured to generate a unique encryption key (temporary encryption key 214) at the time that the original work is generated. The temporary encryption key 214 is used to encode the authentication data into the image, document, audio recording or other creative work. After encryption, the temporary encryption key 214 is deleted, erased or otherwise destroyed. Accordingly, each original work has its own unique secure encryption key. Thus, the authentication data cannot be accessed at a later time because the encryption key 214 is not available and cannot be determined.

Another embodiment generates the temporary encryption key 214 when the device is initially turned on or activated. The temporary encryption key 214 is used for encryption during the time that the device is activated. When the device is turned off or deactivated, the temporary encryption key 214 is deleted, erased or otherwise destroyed. Thus, the authentication data cannot be accessed at a later time.

As described above, biometric data of the originator is determined by embodiments of the present invention and is included as part of the authentication data. One or more of the three types of biometric data may be employed by embodiments of the present invention to determine biometric data that is securely encrypted into the original work at the time of origination.

Fingerprinting logic 206 is configured to operate the above-described fingerprint detector 132 and to determine the unique fingerprint characteristics of the user at the time that the original work is originated. Any suitable fingerprint logic, system or method may be employed by the present invention so long as the authentication data includes fingerprint information that can be used at a later time to identify the originator.

Retina scanning logic 208 is configured to operate the above-described retinal detector 136 and to determine the unique retinal characteristics of the user at the time that the original work is originated. Any suitable retinal scanning logic, system or method may be employed by the present invention so long as the authentication data includes retinal information that can be used at a later time to identify the originator.

Audio logic 210 is configured to operate the above-described microphone 130 and to determine the unique voice characteristics of the user at the time that the original work is originated. Another embodiment simply records the audio information for later analysis. Any suitable audio recording logic, system or method may be employed by the present invention so long as the authentication data includes audio voice information that can be used at a later time to identify the originator.

Device parameter logic 212 is configured to provide other information of interest for inclusion in the authentication data at the time that the original work is originated. For example, but not limited to, location, date, time, light level, color, temperature, f/stop, shutter speed, latitude and longitude of the camera position, camera direction, focusing distance of the camera lens system, the camera pointing direction, and other attributes of interest may be selected for inclusion into the authentication data. The location and time/date information is required. Other types of information are optional. One embodiment allows selection of the other types of information by the user prior to origination of the original work.

Information that is static may be retrieved from a suitable memory location at the time that the authentication data is generated. For example, the serial number of the originating device may be stored into memory and retrieved for inclusion into the authentication data.

Other information may be dynamic and be retrieved from a device configured to detect the information of interest. For example, f/stop information is dynamic in that the f/stop may be changed for one image to the next image, depending upon the ambient conditions under which the image is captured. Accordingly, a device configured to sense the current f/stop at the time that an image is captured provides the f/stop information that is included in the authentication data.

Device parameter logic 212 is further configured to obtain location information from signal receiver 112. Thus, the location of origination is included in the authentication data such that the location of origination can be later determined. Location information may be highly accurate, such as when longitude, latitude and/or elevation information is provided by a GPS system.

Alternatively, location information may more generally define the origination location. For example, the location of the device transmitting to signal receiver 112 may be defined by a parameter, such as, but not limited to, town, telephone area code, mail zip code, or address. Such generalized location information is sufficient in some instances to prove the location of origination. For example, an unscrupulous third party may allege that a song recording was copyrighted and originated by the third party at a specified date in a specified city. The true originator may access the secure encrypted authenticity data in another recording of the song and prove conclusively that the song recording preceded the date of the third party's recording and was recorded in a different city. Or, the authentication data, if existing in the third party's recording, could be directly accessed to disprove the third party's allegations.

Figure 3A:
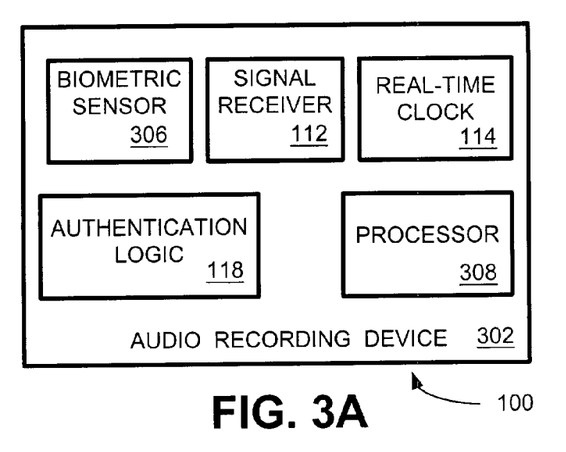
FIG. 3A is a diagram illustrating an embodiment of the authentication information encryption system implemented in an audio recording device.
Figure 3B:
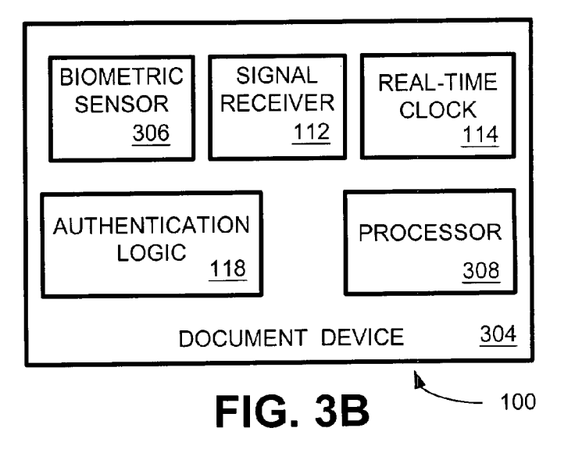
FIG. 3B is a diagram illustrating an embodiment of the authentication information encryption system implemented in a document device.

FIG. 3A is a diagram illustrating an embodiment of the authentication information encryption system 100 implemented in an audio recording device 302. FIG. 3B is a diagram illustrating an embodiment of the authentication information encryption system 100 implemented in a document device 304. The audio recording device 302 and the document device 304 include at least one of the above-described biometric sensors, biometric sensor 306, configured to determine unique retinal information, fingerprint information or voice information of the originator. Other embodiments may include more than one biometric sensor 306.

The audio recording device 302 and the document device 304 include processor 308 configured to execute the authentication logic 118 of the present invention such that authentication data is securely encrypted into an original audio recording or an original document. Also, a signal receiver 112 is included to provide location information and time information for inclusion in the authentication data.

Audio recording device 302 may be any suitable audio recording device. The device may be a portable device, such as a tape recorder, music player/recorder or the like. Or the device may be a large audio recording device such as those found in a professional recording studio.

Document device 304 may be any suitable device configured to originate documents. The device may be a scanner, copy machine, facsimile machine or the like. For example, if the authentication information encryption system 100 is implemented in a copy machine, the "copy" of the document generated by the copy machine is the original document that is encrypted with the authentication data. The authentication data may be hidden as an invisible watermark, or as a visible digital communication such as a bar code or the like.

Figure 4:
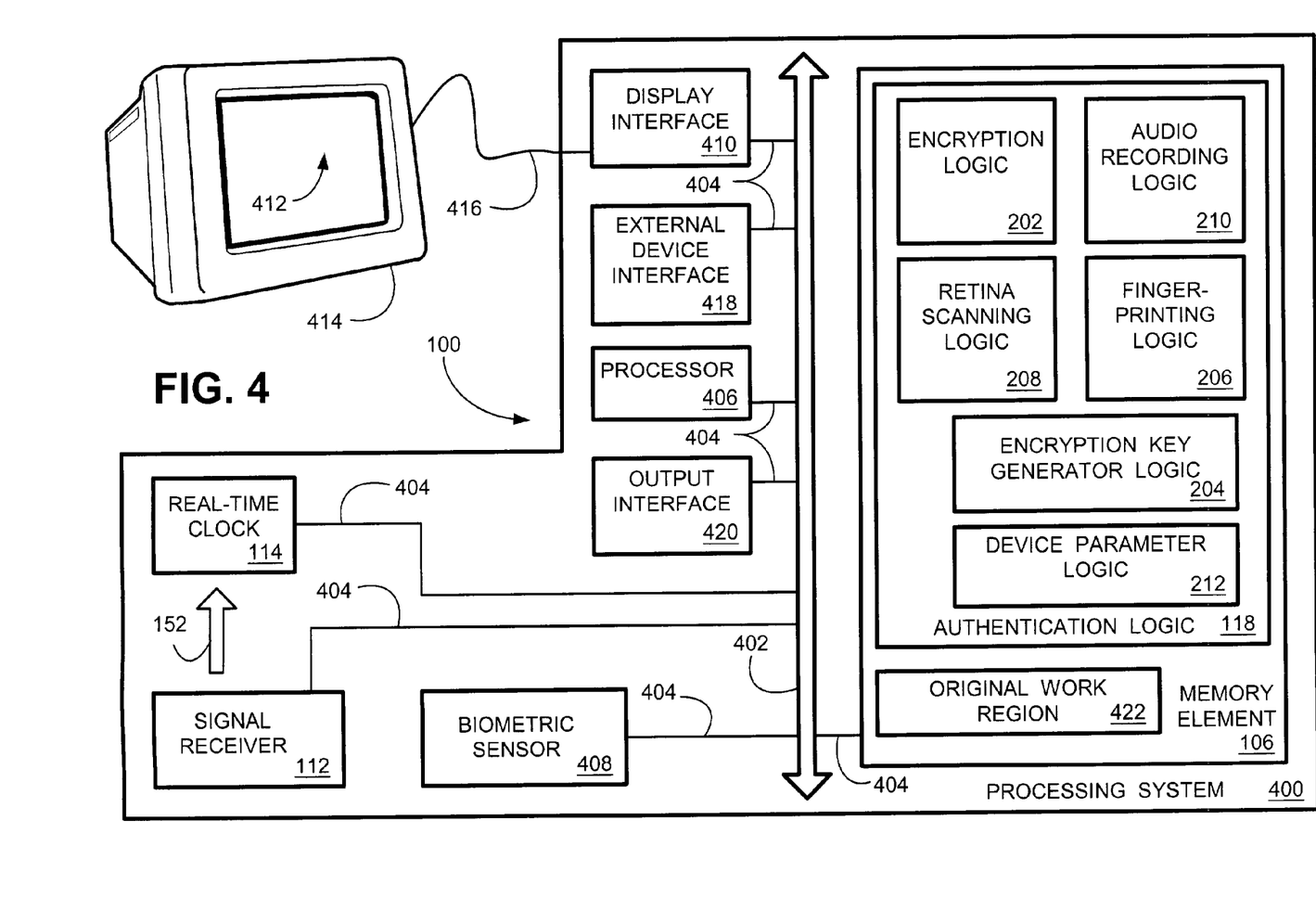
FIG. 4 is a diagram illustrating an embodiment of the authentication information encryption system implemented in a processing system.

FIG. 4 is a diagram illustrating an embodiment of the authentication information encryption system 100 implemented in a processing system 400. Processing system 400 is configured to originate an original work and securely encrypt the original work with authentication data in accordance with the present invention. For example, one embodiment of processing system 400 is a personal computer (PC) or workstation. The PC or workstation may be used to prepare a drawing, image, document or other original work that the originator desires to encrypt with authentication data. Another embodiment of processing system 400 is a computer assisted drawing (CAD) device configured to prepare technical drawings, maps or other original work that is to be securely encrypted with authentication data. Yet another embodiment of processing system 400 is a computer animation device configured to generate complex animations, images or special effects used in videos or movies.

For convenience of illustration, elements in FIG. 4 that are similar to those in FIGS. 1 and 2 bear the same reference numerals. Such elements having the same reference numerals in FIGS. 1, 2 and 4 may be considered to be like elements.

For convenience, components of the processing system 400 are illustrated as connected to communication bus 402, via connections 404. Other embodiments may employ other connectivity methods and systems. For example, but not limited to, communication bus 402 is coupled to processor 406 via a connection 404, thereby providing connectivity to the components of the processing system 400. In alternative embodiments of the processing system 400, the components are communicatively coupled to processor 406 in a different manner than illustrated in FIG. 4. For example, one or more of the components may be directly coupled to processor 404 or may be coupled to processor 404 via intermediary components (not shown).

Embodiments of processing system 400 include at least one of the above-described biometric sensors, biometric sensor 408, configured to determine unique retinal information, fingerprint information or voice information of the originator. Other embodiments may include more than one biometric sensor 408. For convenience, biometric sensor 408 is illustrated as residing within processing system 400 as an internal component. Other embodiments of processing system 400 configured to communicate with a suitable biometric sensor that is a separate, external component.

Embodiments of processing system 400 include a display interface 410. Thus, the original work can be viewed by the originator on display 412 residing in a monitor 414 as images of the original work are communicated over connection 416.

An external device interface 418 is configured to couple to a suitable device such that the originator can instruct the processing system to capture the original work and securely encrypt the original work with authentication data in accordance with the present invention. For example, but not limited to, external device interface 418 may be configured to receive information from the user via a keyboard device. Other examples of input devices include a touch pad, touch screen, mouse, rocker switches or other types of buttons. Such a feature is particularly advantageous when the input devices (not shown) are produced by different vendors that employ different data formats.

Embodiments of processing system 400 include an output interface 420 configured to output an original work, securely encrypted with authentication data prepared in accordance with the present invention, so that the original work may be communicated to others. The output interface 420 may be configured to couple to and communicate over a communication system, such as a telephony system, infrared system, wireless system or network. Thus, the encrypted original work may be stored on a suitable medium such as a memory or the like. Or, the output interface 420 may be configured to couple to and communicate an encrypted original work to another device, such as a film development device or a printing device.

Additionally, a portion of memory element 106 may be used to store the encrypted original work for later retrieval. Thus, an original work storage region 422 is illustrated. Alternatively, the original work storage region 422 may be a separate and/or remote memory element.

In one embodiment, the original work is configured, at the time of encryption, such that the encrypted authentication data prepared in accordance with the present invention can be decrypted, retrieved and analyzed by a third party or the originator in possession of a public key. The public key may be provided and/or identified in a non-encrypted manner with or within the original work. Accordingly, the authenticity of the original work can be ascertained by a third party or the originator after origination of the original work.

In another embodiment, the original work is configured, at the time of encryption, such that the encrypted authentication data prepared in accordance with the present invention cannot be decrypted, retrieved and analyzed by a third party not in possession of a secret, private key. Thus, the authenticity data may be hidden and unknown to a third party. Or, the authentication data may be apparent to a third party, but not be discernable to the third party until the authentication data is decrypted with the secret private key.

The above-described embodiments of the authentication information encryption system 100 that provides for decryption of the authentication data with either a public key or a secret private key may be implemented using any suitable encryption/decryption logic, system or method. Once the authenticity data is decrypted, some information may be easily discernable, such as location, time and/or other information of interest. Other information, such as the biometric data, may require additional processing and analysis by another system. For example, retinal information, by itself, may be difficult to use in proving the identity of the originator. Thus, additional processing and analysis of the decrypted retinal information using another system may be required to confirm that the retinal information corresponds to the originator.

Figure 5:
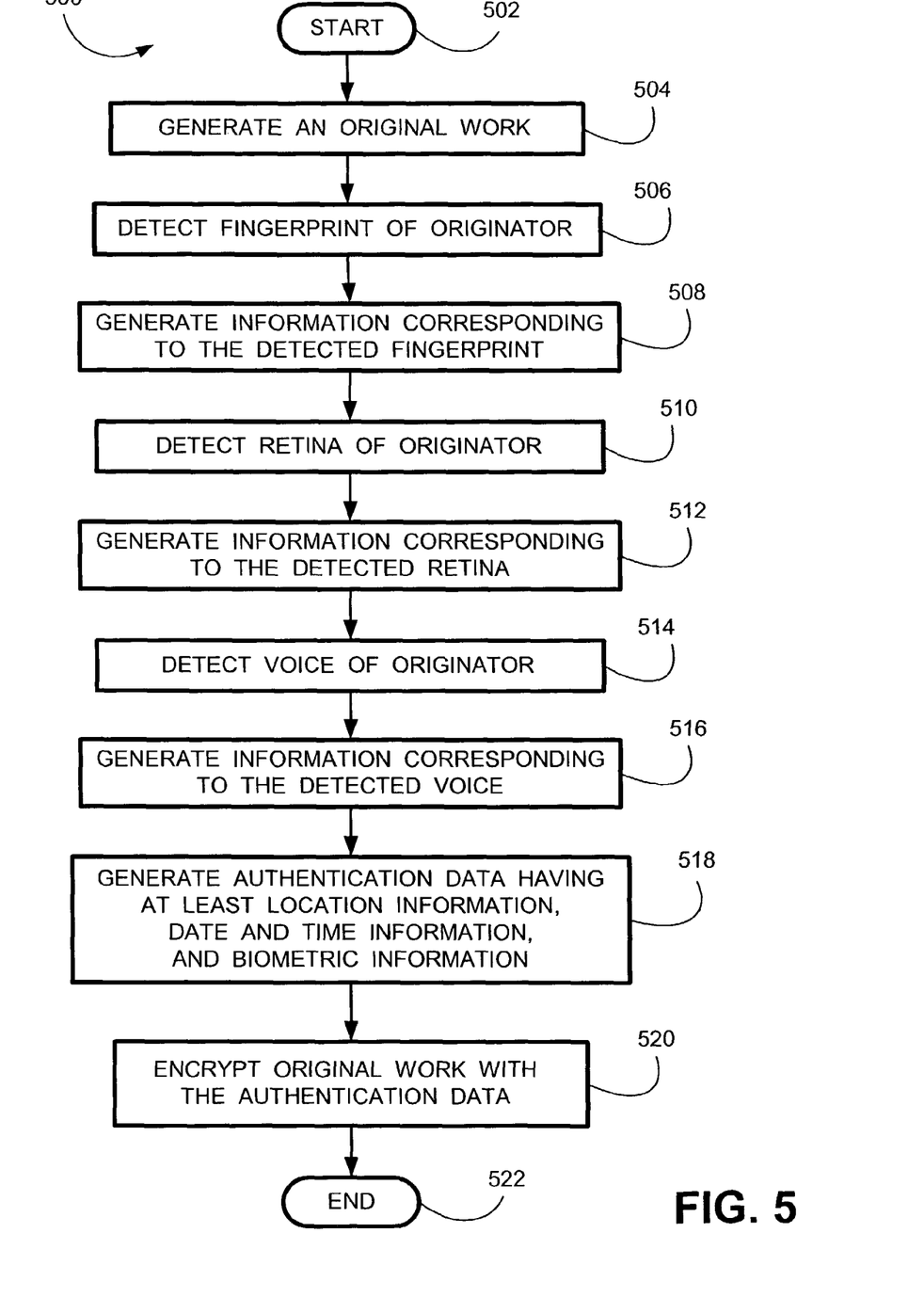
FIG. 5 is a flowchart illustrating a process for encrypting authentication data into an original work by an embodiment of an authentication information encryption device.
Figure 6:
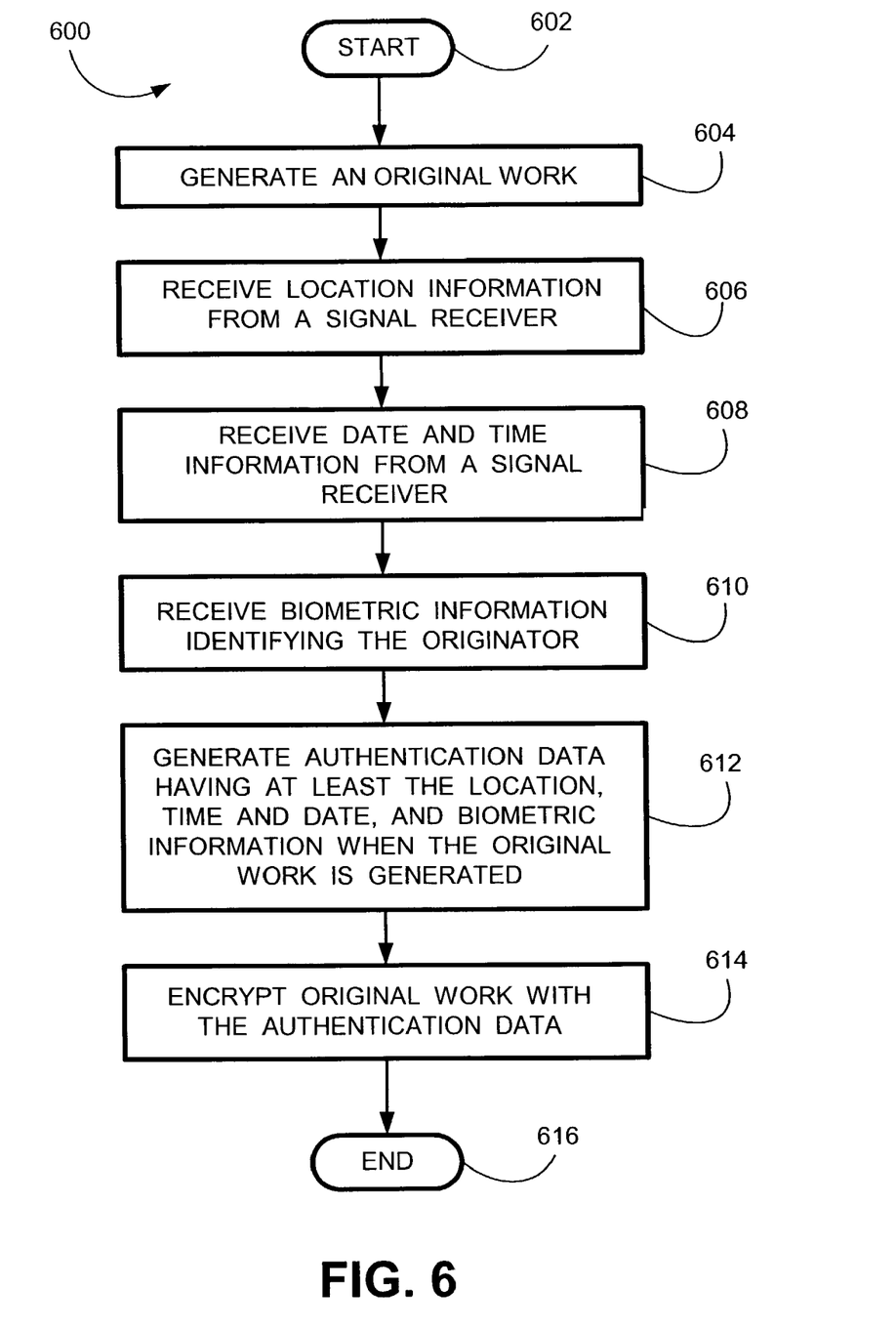
FIG. 6 is a flowchart illustrating a process for encrypting authentication data into an original work by another embodiment of an authentication information encryption device.

FIG. 5 is a flowchart 500 illustrating a process for encrypting authentication data into an original work by an embodiment of an authentication information encryption device 100. FIG. 6 is a flowchart 600 illustrating a process for encrypting authentication data into an original work by another embodiment of an authentication information encryption device 100. The flow charts 500 and 600 show the functionality and operation of a possible implementation of the software for implementing the authentication logic 118 (FIGS. 1-4). In this regard, each block may represent a module, segment, or portion of code, which comprises one or more executable instructions for implementing the specified logical function (s). It should also be noted that in some alternative implementations, the functions noted in the blocks may occur out of the order noted in FIGS. 5 and/or 6 or may include additional functions without departing significantly from the functionality of the authentication information encryption system 100. For example, two blocks shown in succession in FIGS. 5 and/or 6 may in fact be executed substantially concurrently, the blocks may sometimes be executed in the reverse order, or some of the blocks may not be executed in all instances, depending upon the functionality involved, as will be further clarified below. All such modifications and variations are intended to be included within the scope of this disclosure for the authentication information encryption system 100.

In one embodiment, the process starts at block 502. At block 504 an original work is generated. At block 506 a fingerprint of the originator is detected. At block 508 information corresponding to the detected fingerprint is generated. At block 510 a retina of the eye of the originator is detected. At block 512 information corresponding to the detected retina is generated. At block 514 the voice of the originator is detected. At block 516 information corresponding to the detected voice is generated. At block 518 authentication data is generated when the original work is generated, the authentication data comprising at least location information, date and time information, and at least one type of the above-described biometric information. At block 520 the original work with the authentication data is encrypted using a secret private key. The process ends at block 522.

In another embodiment, the process starts at block 602. At block 604 an original work is generated. At block 606 the location information is received identifying the location where the original work is generated. At block 608 the date and time information is received identifying when the original work is generated. At block 610 the biometric information is received identifying an originator of the original work. The above-described location information, and the date and time information, is received from signal receiver 112 (FIGS. 1-4). The above-described biometric data is received from a biometric sensor. At block 614 authentication data is generated having the received location information, the received date and time information, and the received biometric information when the original work is generated. At block 614 the original work with the authentication data is encrypted using a secret private key. The process ends at block 616.

When the authentication logic 118 is implemented as software and stored in memory element 106, authentication logic 118 can be stored on any computer-readable medium for use by or in connection with any computer and/or processor related system or method. In the context of this document, a memory element 106 is a computer-readable medium that is an electronic, magnetic, optical, or other another physical device or means that contains or stores a computer and/or processor program. Authentication logic 118 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with authentication logic 118. In the context of this specification, a "computer-readable medium" can be any means that can store, communicate, propagate, or transport the program associated with authentication logic 118 for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM), compact disc read-write (CDRW), or other memory mediums now known or later developed. Note that the computer-readable medium, could even be paper or another suitable medium upon which the program associated with authentication logic 118 is printed, as the program can be electronically captured, via for instance, optical scanning of the paper or other medium, then compiled, interpreted or otherwise processed in a suitable manner if necessary, and then stored in memory element 106.

Camera processor 110 and/or processors 308 or 409 may comprise a commercially available processor. Examples of commercially available processors include, but are not limited to, an 80x86 or Pentium series microprocessor from Intel Corporation, U.S.A., a PowerPC microprocessor from IBM., a Sparc microprocessor from Sun Microsystems, Inc., a PA-RISC series microprocessor from Hewlett-Packard Company, or a 68xxx series microprocessor from Motorola Corporation. Camera processor 110 and/or processors 308 or 409 control the execution of a program, employed by the present invention, residing in authentication logic 118. Other embodiments of camera processor 110 and/or processors 308 or 409 may comprise specially designed and fabricated processors.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for encrypting authentication information into an original work, the method comprising:
   generating the original work, the original work comprising an image, document, or audio recording;
   generating authentication data when the original work is generated, the authentication data comprising at least:
   information corresponding to a background noise that is detected when the original work is generated;
   location information identifying a location where the original work is generated, the location information provided by a received signal from a remote device, such that the information corresponding to the background noise is part of the authentication data in that the information corresponding to the background noise provides evidence that the location information is correct;
   date and time information identifying when the original work is generated, the date and time information provided by the received signal from the remote device; and
   biometric information identifying an originator of the original work;
   generating an encryption key used to encrypt the authentication information into the original work;
   encrypting the original work with the authentication data using the encryption key when the original work is generated; and
   destroying the generated encryption key after the step of encryption is completed.

2. The method of claim 1, further comprising:
   detecting a fingerprint of the originator;
   generating information corresponding to the detected fingerprint; and
   encrypting the original work with the generated information.

3. The method of claim 1, further comprising:
   detecting an eye of the originator;
   generating information corresponding to a retina of the eye; and
   encrypting the original work with the generated information.

4. The method of claim 1, further comprising:
   detecting a voice of the originator;
   generating information corresponding to the detected voice; and
   encrypting the original work with the generated information.

5. The method of claim 1, further comprising:
   capturing an image of a distinguishing characteristic of the originator;
   generating information corresponding to the captured image; and
   encrypting the original work with the generated information.

6. The method of claim 1, further comprising receiving a signal having the location information.

7. The method of claim 1, further comprising receiving a signal having the date and time information.

8. The method of claim 1, further comprising:
   generating information of interest when original work is generated; and
   encrypting the original work with the generated information of interest.

9. The method of claim 8, wherein the information of interest comprises at least one selected from a group consisting of a light level, a color, a temperature, an f/stop, a shutter speed, a camera direction, a focusing distance of a camera lens system and a direction.

10. The method of claim 1, wherein the location information comprises at least one selected from a group consisting of a latitude and a longitude where the original work is generated, an address of a transmitting device, a telephone area code of the transmitting device, altitude of the transmitting device, depth of the transmitting device, ambient pressure surrounding the transmitting device and a mail zip code of the transmitting device.

11. The method of claim 1, wherein the original work comprises at least one selected from a group consisting of an image, an audio recording and a document.

12. The method of claim 1, further comprising capturing an image such that the encrypted original work is a captured image.

13. The method of claim 1, further comprising generating a document such that the encrypted original work is a document.

14. The method of claim 1, further comprising recording audio information such that the encrypted original work is an audio recording.

15. The method of claim 1, wherein the background noise that is detected when the original work is generated is not reduced or removed prior to encryption of the authentication data that includes the information corresponding to the background noise.

16. A system for encrypting authentication information into an original work, comprising:
    means for generating the original work the original work comprising an image, document, or audio recording;
    means for detecting a background noise from where the original work is generated;
    means for generating information corresponding to the background noise;
    means for receiving location information identifying the location where the original work is generated, the location information provided by a received signal from a remote device, such that the information corresponding to the background noise is part of the authentication data in that the information corresponding to the background noise provides evidence that the location information is correct;
    means for receiving date and time information identifying when the original work is generated, the date and time information provided by the received signal from the remote device;
    means for receiving biometric information identifying an originator of the original work;
    means for generating authentication data when the original work is generated, the authentication data including at least the information corresponding to the background noise;
    means for generating an encryption key used to encrypt the authentication information into the original work;
    means for encrypting the original work with the authentication data using the encryption key when the original work is generated; and
    means for destroying the generated encryption key after the step of encryption is completed.

17. The system of claim 16, further comprising:
    means for detecting a fingerprint of the originator;
    means for generating information corresponding to the detected fingerprint; and
    means for encrypting the original work with the generated information.

18. The system of claim 16, further comprising:
    means for detecting an eye of the originator;
    means for generating information corresponding to a retina of the eye; and
    means for encrypting the original work with the generated information.

19. The system of claim 16, further comprising:
    means for detecting a voice of the originator;
    means for generating information corresponding to the detected voice; and
    means for encrypting the original work with the generated information.

20. The system of claim 16, wherein the background noise that is detected when the original work is generated is not reduced or removed prior to encryption of the authentication data that includes the information corresponding to the background noise.

21. A non-transitory computer-readable medium having a program for encrypting authentication information into an original work, the program comprising logic configured to:
    detect a background noise from where the original work is generated;
    generate information corresponding to the background noise;
    receive location information identifying a location where the original work is generated, the location information provided by a received signal from a remote device, the original work comprising an image, document, or audio recording, such that the information corresponding to the background noise is part of the authentication data in that the information corresponding to the background noise provides evidence that the location information is correct;
    receive date and time information identifying when the original work is generated, the date and time information provided by the received signal from the remote device;
    receive biometric information identifying an originator of the original work;
    generate authentication data when the original work is generated, the authentication data including at least the information corresponding to the background noise;
    generate an encryption key used to encrypt the authentication information into the original work;
    encrypt the original work with the authentication data using the encryption key when the original work is generated; and
    destroy the generated encryption key after the step of encryption is completed.

22. The non-transitory computer-readable medium of claim 21, wherein the background noise that is detected when the original work is generated is not reduced or removed prior to encryption of the authentication data that includes the information corresponding to the background noise.

* * * * *

UNITED STATES PATENT AND TRADEMARK OFFICE
CERTIFICATE OF CORRECTION

| | | |
|---|---|---|
| PATENT NO. | : 7,979,698 B2 | Page 1 of 1 |
| APPLICATION NO. | : 10/368692 | |
| DATED | : July 12, 2011 | |
| INVENTOR(S) | : Joseph D. Wong | |

It is certified that error appears in the above-identified patent and that said Letters Patent is hereby corrected as shown below:

In column 15, line 23, in Claim 16, delete "work the" and insert -- work, the --, therefor.

Signed and Sealed this
Third Day of April, 2012

David J. Kappos
*Director of the United States Patent and Trademark Office*